United States Patent
Dutta

(10) Patent No.: US 7,706,748 B2
(45) Date of Patent: Apr. 27, 2010

(54) METHODS OF GROUND BASED BEAMFORMING AND ON-BOARD FREQUENCY TRANSLATION AND RELATED SYSTEMS

(75) Inventor: Santanu Dutta, Cary, NC (US)

(73) Assignee: ATC Technologies, LLC, Reston, VA (US)

(*) Notice: Subject to any disclaimer, the term of this patent is extended or adjusted under 35 U.S.C. 154(b) by 750 days.

(21) Appl. No.: 11/167,010

(22) Filed: Jun. 24, 2005

(65) Prior Publication Data

US 2005/0288011 A1  Dec. 29, 2005

Related U.S. Application Data

(60) Provisional application No. 60/583,218, filed on Jun. 25, 2004.

(51) Int. Cl.
*H04B 7/185* (2006.01)
(52) U.S. Cl. .................. 455/13.3; 455/427; 455/428; 455/455; 370/316
(58) Field of Classification Search ............... 455/3.02, 455/3.03, 427–431, 11.1, 12.1, 15, 20, 22; 370/316
See application file for complete search history.

(56) References Cited

U.S. PATENT DOCUMENTS

| 4,450,582 A | 5/1984 | Russell |
| 4,901,307 A | 2/1990 | Gilhousen et al. |
| 4,965,809 A * | 10/1990 | Endo .......................... 375/260 |
| 5,073,900 A | 12/1991 | Mallinckrodt |

(Continued)

FOREIGN PATENT DOCUMENTS

EP        0 506 255 A2    9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Edward Urban
*Assistant Examiner*—Fayyaz Alam
(74) *Attorney, Agent, or Firm*—Myers Bigel Sibley & Sajovec, P.A.

(57) ABSTRACT

Methods are provided to operate a communications system including a satellite and a satellite gateway. In particular, a feeder link may be provided between the satellite and the satellite gateway over a feeder link frequency band for communication of information between the satellite gateway and the satellite. A service link may be provided between the satellite and at least one radioterminal in a coverage area of the satellite over a service link frequency band. Moreover, the feeder link and service link frequency bands may be different. In addition, a frequency segment of the feeder link may be linearly translated from the feeder link frequency band to the service link frequency band to provide a frequency segment of the service link. Related satellites are also discussed.

48 Claims, 4 Drawing Sheets

U.S. PATENT DOCUMENTS

| | | |
|---|---|---|
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,404,775 B1* | 6/2002 | Leslie et al. ................. 370/466 |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,167,528 B2* | 1/2007 | Chen et al. .................. 375/302 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0050008 A1* | 3/2003 | Patterson et al. ............ 455/12.1 |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0097192 A1* | 5/2004 | Schiff ......................... 455/12.1 |
| 2004/0102156 A1 | 5/2004 | Loner |
| 2004/0110467 A1* | 6/2004 | Wang ......................... 455/12.1 |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0003699 A1* | 1/2006 | Gibson et al. ............... 455/12.1 |
| 2006/0040659 A1 | 2/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 085 680 A2 | 3/2001 |
| EP | 1 193 989 A1 | 4/2002 |

| | | | |
|---|---|---|---|
| WO | WO 01/54314 A1 | 7/2001 | |

OTHER PUBLICATIONS

Ayyagari et al., "A satellite-augmented cellular network concept", *Wireless Networks*, Vo. 4, 1998, pp. 189-198.

International Search Report and Written Opinion of the International Search Report for PCT/US2005/022596.

* cited by examiner

METHODS OF GROUND BASED BEAMFORMING AND ON-BOARD FREQUENCY TRANSLATION AND RELATED SYSTEMS

RELATED APPLICATION

The present application claims the benefit of priority from U.S. Provisional Application No. 60/583,218 filed Jun. 25, 2004, and entitled "Methods Of Ground Based Beamforming And On-Board Frequency Translation And Related Systems." The disclosure of the above referenced U.S. provision application is hereby incorporated herein in its entirety by reference.

FIELD OF THE INVENTION

This invention relates to wireless communications systems and methods, and more particularly to satellite communications systems and methods.

BACKGROUND

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. Radiotelephones may also be referred to herein as "radioterminals" or simply "terminals".

As is well known to those having skill in the art, terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission of at least some of the satellite band frequencies can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

United States Patent Application Publication No. U.S. 2003/0054760 A1, published Mar. 20, 2003, and entitled Systems and Methods for Terrestrial Reuse of Cellular Satellite Frequency Spectrum, the disclosure of which is hereby incorporated herein by reference in its entirety as if set forth fully herein, describes that a satellite radiotelephone frequency can be reused terrestrially by an ancillary terrestrial network even within the same satellite cell, using interference cancellation techniques. In particular, the satellite radiotelephone system according to some embodiments of published Patent Application 2003/0054760 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

United States Patent Application Publication No. 2003/0054761 A1, published Mar. 20, 2003, and entitled Spatial Guardbands for Terrestrial Reuse of Satellite Frequencies, the disclosure of which is hereby incorporated herein by reference in its entirety as if set forth fully herein, describes satellite radiotelephone systems that include a space-based component that is configured to provide wireless radiotelephone communications in a satellite footprint over a satellite radiotelephone frequency band. The satellite footprint is divided into a plurality of satellite cells, in which satellite radiotelephone frequencies of the satellite radiotelephone frequency band are spatially reused. An ancillary terrestrial network is configured to terrestrially reuse at least one of the ancillary radiotelephone frequencies that is used in a satellite cell in the satellite footprint, outside the cell and in some embodiments separated therefrom by a spatial guardband. The spatial guardband may be sufficiently large to reduce or prevent interference between the at least one of the satellite radiotelephone frequencies that is used in the satellite cell in the satellite footprint, and the at least one of the satellite radiotelephone frequencies that is terrestrially reused outside the satellite cell and separated therefrom by the spatial guardband. The spatial guardband may be about half a radius of a satellite cell in width.

United States Patent Application Publication No. U.S. 2003/0054815 A1, published Mar. 20, 2003, and entitled Methods and Systems for Modifying Satellite Antenna Cell Patterns in Response to Terrestrial Reuse of Satellite Frequencies, the disclosure of which is hereby incorporated herein by reference in its entirety as if set forth fully herein, describes that space-based wireless radiotelephone communications are provided in a satellite footprint over a satellite radiotelephone frequency band. The satellite footprint is divided into satellite cells in which satellite radiotelephone frequencies of the satellite radiotelephone frequency band are spatially reused. At least one of the satellite radiotelephone frequencies that is assigned to a given satellite cell in the satellite footprint is terrestrially reused outside the given satellite cell. A radiation pattern of at least the given satellite cell is modified to reduce interference with the at least one of the satellite radiotelephone frequencies that is terrestrially reused outside the given satellite cell.

SUMMARY OF THE INVENTION

According to some embodiments of the present invention, methods may be provided to operate a communications system including a satellite and a satellite gateway. In particular, a feeder link may be provided between the satellite and the satellite gateway over a feeder link frequency band for communication of information between the satellite gateway and the satellite. A service link may be provided between the satellite and at least one radioterminal in a coverage area of the satellite over a service link frequency band, and the feeder link and service link frequency bands may be different. In addition, a frequency segment of the feeder link may be linearly translated from the feeder link frequency band to the service link frequency band to provide a frequency segment of the service link. The frequency segment of the service link may provide content for the at least one radioterminal and/or for a plurality of radioterminals in the coverage area.

A second service link may also be provided between the satellite and at least one radioterminal in a second coverage area of the satellite over the service link frequency band. Moreover, a second frequency segment of the feeder link may be linearly translated from the feeder link frequency band to the service link frequency band to provide a second frequency segment of the second service link. The first frequency segment of the first service link may provide content for a first plurality of radioterminals in the first coverage area, and the second frequency segment of the second service link may provide content for a second plurality of radioterminals in the second coverage area. Moreover, the first frequency segment of the feeder link may be transmitted to the satellite using a first polarization, the second frequency segment of the feeder link may be transmitted to the satellite using a second polarization, and the first and second polarizations may be different. More particularly, the second polarization may be orthogonal with respect to the first polarization. In addition, a bandwidth of frequencies spanned by the frequency segment of the feeder link may be about the same as a bandwidth of frequencies spanned by the frequency segment of the service link.

A second feeder link may also be provided between the satellite and a second satellite gateway over the feeder link frequency band for communication of information between the second satellite gateway and the satellite, and a second service link may be provided between the satellite and at least one radioterminal in a second coverage area of the satellite over the service link frequency band. In addition, a frequency segment of the second feeder link may be linearly translated from the feeder link frequency band to the service link frequency band to provide a second frequency segment of the second service link. The first frequency segment of the first service link may provide content for a first plurality of radioterminals in the first coverage area, and the second frequency segment of the second service link may provide content for a second plurality of radioterminals in the second coverage area. Interference between feeder links may be reduced by transmitting first pilot signals from the first satellite gateway to the satellite over the first feeder link, and transmitting second pilot signals from the second satellite gateway to the satellite over the second feeder link with the first and second pilot signals being different. Accordingly, interference cancellation may be performed at the satellite based on a priori knowledge of the first and second pilot signals.

According to additional embodiments of the present invention, methods may be provided to operate a communications system including a satellite and a satellite gateway. In particular, a feeder link may be provided between the satellite and the satellite gateway over a feeder link frequency band for communication of information between the satellite gateway and the satellite. In addition, a service link may be provided between the satellite and at least one radioterminal in a coverage area of the satellite over a service link frequency band, and the feeder link and service link frequency bands may be different. A frequency segment of the service link may be linearly translated from the service link frequency band to the feeder link frequency band to provide a frequency segment of the feeder link.

The frequency segment of the service link may provide content from the at least one radioterminal and/or from a plurality of radioterminals in the coverage area. In addition, a bandwidth of frequencies spanned by the frequency segment of the feeder link may be about the same as a bandwidth of frequencies spanned by the frequency segment of the service link.

A second service link may also be provided between the satellite and at least one radioterminal in a second coverage area of the satellite over the service link frequency band, and a second frequency segment of the second service link may be linearly translated from the service link frequency band to the feeder link frequency band to provide a second frequency segment of the feeder link. Moreover, the first frequency segment of the first service link may provide content from a first plurality of radioterminals in the first coverage area, and the second frequency segment of the second service link may provide content from a second plurality of radioterminals in the second coverage area. In addition, the first frequency segment of the feeder link may transmitted from the satellite using a first polarization, the second frequency segment of the feeder link may be transmitted from the satellite using a second polarization, and the first and second polarizations may be different. More particularly, the second polarization may be orthogonal with respect to the first polarization. The frequency segment of the service link may provide content for the at least one radioterminal and/or for a plurality of radioterminals in the coverage area.

In addition, a second feeder link may be provided between the satellite and a second satellite gateway over the feeder link frequency band for communication of information between the second satellite gateway and the satellite, and a second service link may be provided between the satellite and at least one radioterminal in a second coverage area of the satellite over the service link frequency band. Moreover, a second frequency segment of the second service link may be linearly translated from the service link frequency band to the feeder link frequency band to provide a second frequency segment of the second feeder link. The first frequency segment from the first service link may provide content from a first plurality of radioterminals in the first coverage area, and the second frequency segment from the second service link may provide content from a second plurality of radioterminals in the second coverage area. In addition, first pilot signals may be transmitted from the satellite over the first feeder link to the first satellite gateway, second pilot signals may be transmitted from the satellite over the second feeder link to the second satellite gateway, and the first and second pilot signals may be different. Interference cancellation may thus be performed at the first and second satellite gateways based on a priori knowledge of the first and second pilot signals.

According to still more embodiments of the present invention, a satellite may be provided to relay communications between a satellite gateway and at least one radioterminal in a coverage area of the satellite. The satellite may include a feeder link receiver, a service link transmitter and a frequency translator. The feeder link receiver may be configured to receive information from the satellite gateway using a feeder link provided over a feeder link frequency band. The service link transmitter may be configured to transmit information to the at least one radioterminal in the coverage area using a service link provided over a service link frequency band, and the service link frequency band and the feeder link frequency band may be different. The frequency translator may be coupled between the feeder link receiver and the service link transmitter, and the frequency translator may be configured to provide linear frequency translation of a frequency segment of the feeder link from the feeder link frequency band to the service link frequency band to thereby provide a frequency segment of the service link.

According to yet additional embodiments of the present invention, a satellite may be provided to relay communications between a satellite gateway and at least one radioterminal in a coverage area of the satellite. The satellite may include a service link receiver, a feeder link transmitter, and a frequency translator coupled between the service link receiver and the feeder link transmitter. The service link receiver may be configured to receive information from the at least one radioterminal in the coverage area using a service link provided over a service link frequency band. The feeder link transmitter may be configured to transmit information to the satellite gateway using a feeder link provided over a feeder link frequency band, and the service link frequency band and the feeder link frequency band may be different. The frequency translator may be configured to provide linear frequency translation of a frequency segment of the service link from the service link frequency band to the feeder link frequency band to provide a frequency segment of the feeder link.

DETAILED DESCRIPTION

Figure 1:
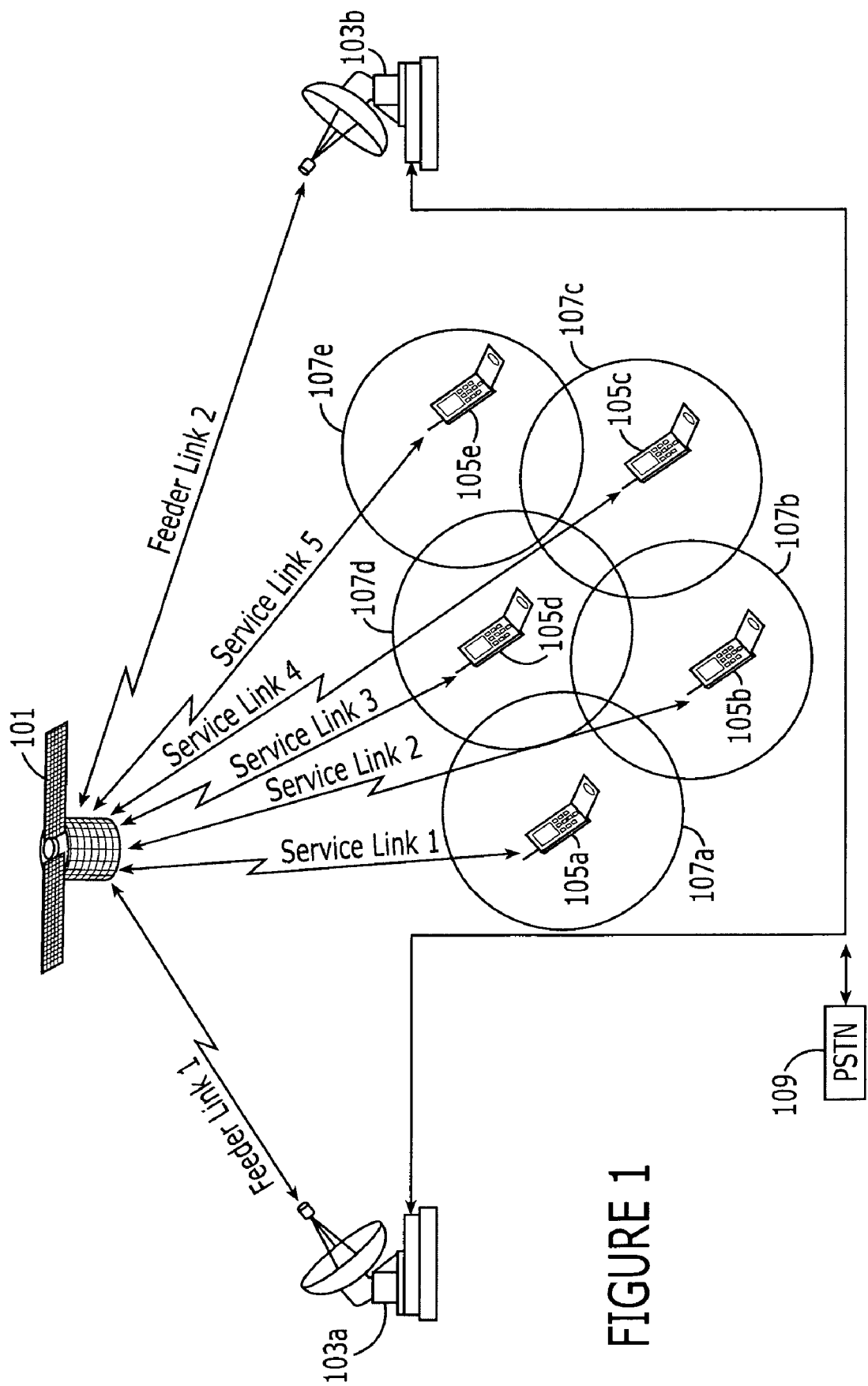
FIG. 1 is a diagram illustrating a space-based communications network including satellite gateways, at least one satellite, and mobile radioterminals according to embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first component below could be termed a second component, and similarly, a second component may be termed a first component without departing from the teachings of the present invention. As used herein, the term "and/or" includes any and all combinations of one or more of the associated listed items. The symbol "/" is also used as a shorthand notation for "and/or".

As shown in FIG. 1, a space-based communications network may include at least one satellite 101 and one or more ground-based satellite gateways 103a-b providing communications service for mobile radioterminals 105a-e located in one or more coverage areas 107a-e of the satellite 101. Communications with a mobile radiotelephone 105a-e may be provided using a respective service link transmitted over a satellite spot beam for the respective coverage area 107a-e. Moreover, a service link for a particular mobile radioterminal may be defined to include a service up-link for transmission from the mobile radioterminal to the satellite 101 and a service down-link for transmissions from the satellite 101 to the mobile radioterminal. A satellite spot beam for a respective coverage area may support a plurality of service links for a respective plurality of mobile radioterminals in the coverage area. Different service down-links in a same and/or different spot beam may be separated, for example, by frequency, time, and/or code. Similarly, different service up-links in a same and/or different spot beam may be separated, for example, by frequency (for example, FDM/FDMA and/or OFDM/OFDMA), time (for example, TDM/TDMA), and/or code (for example, CDM/CDMA).

By providing a plurality of antenna elements at the satellite 101, a service link can be directed over a particular spot beam providing service for a mobile radioterminal located in a respective coverage area. When transmitting a service down-link from the satellite for a particular mobile radioterminal, different complex weightings may be applied from the different antenna elements to define the spot beam over which the service down-link is to be transmitted. Accordingly, a frequency reuse pattern may be established for the different spot beams providing service for the different coverage areas so that the same frequencies may not be used for service up-links in adjacent coverage areas and so that the same frequencies may not be used for service down-links in adjacent coverage areas. For example, the same frequencies may not be used for service up-links and down-links in coverage areas 107a and 107b. In contrast, one or more of the same frequencies may be used for service up-links and down-links in coverage areas 107a and 107c.

Similarly, communications may be transmitted between the satellite 101 and one or more satellite gateways 103a-b using respective feeder links. Moreover, a feeder link for a particular satellite gateway may be defined to include a feeder up-link for transmissions from the satellite gateway to the satellite(s) and a feeder down-link for transmissions from the satellite(s) to the satellite gateway. Moreover, one or more satellite gateways 103a-b may be coupled to a conventional communications network such as a public switched wireline and/or wireless telephone network 109.

Accordingly, communications between a mobile radioterminal and the public switched telephone network 109 may be supported by a service link between the mobile ratioterminal and the satellite 101 and by a feeder link between the satellite 101 and a satellite gateway. More particularly, transmissions from the public switched telephone network 109 to the mobile radioterminal 105a may be provided using a feeder up-link, such as a feeder link of Feeder Link 1 from the satellite gateway 103a, to the satellite 101 and using a service down-link of Service Link 1 from satellite 101 to mobile radioterminal 105a over a spot beam for coverage area 107a. Transmissions from the mobile radioterminal 105a to the public switched telephone network 109 may be provided using a service up-link of Service Link 1 from the mobile radioterminal 105a to the satellite 101 over the spot beam providing service for coverage area 107a, and using a feeder down-link, such as a feeder down-link of Feeder Link 1, from satellite 101 to the satellite gateway 103a.

The Feeder Link(s) between one or more satellite gateways 103a-b and the satellite 101 may be provided over a feeder link frequency band(s) (such as a Ku-band feeder link frequency band(s)), the Service Links between one or more mobile radioterminals 105a-e and the satellite 101 may be provided over a service link frequency band(s) (such as an L-band and/or an S-band service link frequency band(s)), and the feeder link and service link frequency bands may be different. For example, information for a transmission from PSTN 109 to mobile radioterminal 105a is transmitted on a feeder up-link of Feeder Link 1 in the feeder link frequency band and then transmitted on a service down-link of Service Link 1 in the service link frequency band. Accordingly, the information is mapped from the feeder link frequency band to the service link frequency band. Similarly, information for a transmission from the mobile radioterminal 105a to the PSTN 109 is transmitted on a service up-link of Service Link 1 in the service link frequency band and then transmitted on a feeder down-link of Feeder Link 1 (and/or Feeder Link 2) in the feeder link frequency band. Accordingly, the information is mapped from the service link frequency band to the feeder link frequency band.

Service link beam forming may be performed either at the satellite 101 and/or at the satellite gateway. For example, in the Thuraya and ACeS geo-stationary satellite systems, service link beam forming is performed at the satellite (Thuraya performs beam forming digitally, while analog beam forming is implemented in ACeS). Also, in the Iridium and Globalstar non-geo-stationary satellite systems, service link beam forming is performed at the satellite(s). In contrast to satellite-based service link beam forming, U.S. Pat. No. 5,903,549 to von der Embse et al. describes a method permitting beam forming at a ground station. The disclosure of U.S. Pat. No. 5,903,549 is hereby incorporated herein by reference in its entirety as if set forth fully herein. Also, U.S. Provisional Application No. 60/572,164 filed May 18, 2004, entitled Space-Based Networks And Methods With Ground-Based Beam Forming describes ground-based and space-based beam forming systems and methods. The above referenced U.S. Provisional Application is assigned to the assignee of the present invention, and the disclosure of the above referenced U.S. Provisional Application is hereby incorporated herein by reference in its entirety as if set forth fully herein. As discussed above, beam forming for a service link is used to define a spot beam over which the service down-link is transmitted from the satellite and over which the service up-link is received at the satellite. For example, the spot beam for a service down-link can be defined by applying different weights (such as different complex weights providing different phase and amplitude information) to the service down-link for each antenna feed element to provide a desired antenna pattern gain and/or phase profile(s) over a spot beam to a satellite coverage area on the ground. When transmitted to the ground, these antenna pattern gain and/or phase profiles may define a spot beam for a satellite coverage area (also referred to as a satellite cell) having a desired size, amplitude roll-off, and/or phase characteristic.

A non-demodulating and/or non-regenerating satellite transponder may perform the following signal processing tasks. First, the satellite transponder may provide frequency translation between the feeder link frequency spectrum and the service link frequency spectrum. Second, the satellite transponder may perform beam forming operations as discussed above. More particularly, the satellite transponder may determine and/or receive from the ground the weights (such as complex weights providing phase and amplitude information) to be applied to each service link for each antenna element to direct the service link over the appropriate spot beam.

Figure 2A:
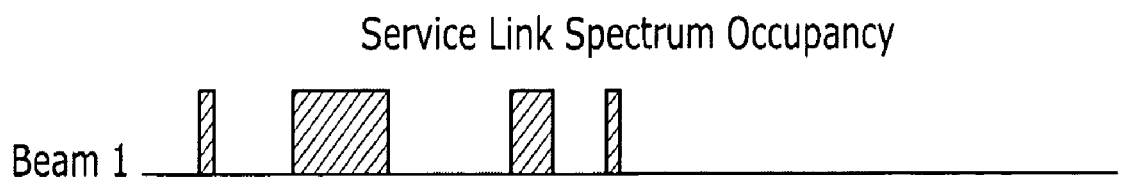
FIGS. 2a-c are spectrum occupancy diagrams illustrating transponder frequency translation using arbitrary spectrum mapping.
Figure 2B:
Figure 2C:
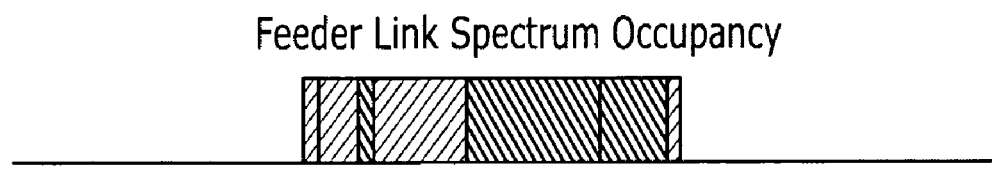

According to a particular example illustrated in FIGS. 2a-c, a first spot beam (Beam 1) transmitted from a satellite to a first satellite coverage area may include service links to be transmitted over the service link frequency spectrum as illustrated in FIG. 2a, and a second spot beam (Beam 2) transmitted from the satellite to a second satellite coverage area may include service links to be transmitted over the service link frequency spectrum as illustrated in FIG. 2b. In the example of FIGS. 2a-c, Beam 1 and Beam 2 may provide service for non-adjacent satellite coverage areas to reduce interference between service links using overlapping portions of the service link frequency band (spectrum). Moreover, occupancy of the service link frequency band by service links of either Beam 1 or Beam 2 may be non-contiguous as shown in FIGS. 2a and 2b.

The information for the service links of Beams 1 and 2 may be communicated between a satellite gateway and the satellite over a feeder link using a feeder link frequency band different than the service link frequency band used for Beams 1 and 2. As shown in FIG. 2c, portions of the service link frequency band occupied by service links of Beams 1 and 2 may be translated (or mapped) to/from the feeder link frequency band in a manner so that an occupied portion of the feeder link frequency band is compacted. Frequency translation (mapping) as illustrated in FIGS. 2a-c, may be referred to as non-linear mapping and/or arbitrary mapping.

By compacting the information transmitted over the feeder link, an efficiency of usage of the feeder link frequency band can be improved. Compacting, however, may require the use of a relatively large number of frequency translators. For example, a different frequency translator may be used for each block of the service link frequency band of each spot beam being translated to/from the feeder link frequency band with a different frequency shift. In the example of FIGS. 2a-c, seven frequency translators may be used at the satellite to accomplish the illustrated translations. Each frequency translator may be provided by one or more digital signal processors performing digital filtering using fast Fourier transforms (FFT) and/or inverse fast Fourier transforms (IFFT). Accordingly, a digital signal processing (DSP) module may be used to perform beam forming and/or frequency translation functions.

While a digital signal processor in a satellite transponder may provide flexibility in frequency translation and/or beam forming, a digital signal processing module for a satellite may be one of the most complex items in a satellite payload. Moreover, increasingly complex digital signal processing modules in satellites may significantly increase power consumption, payload mass, reliability, and/or satellite cost, and increasingly complex digital signal processing modules may also lengthen schedules to build and/or deploy a satellite. Accordingly, advantages may be provided by reducing a complexity of and/or eliminating a digital signal processing module in a satellite by moving signal processing functions to one or more ground based satellite gateways.

In particular, a linear frequency translation (mapping) of information between the feeder link frequency band and the service link frequency band can be used to reduce a complexity of processing performed at the satellite 101, and the beam forming may be performed at the satellite gateway(s) 103a and/or 103b. More particularly, the feeder link frequency band may be divided into segments, with each segment of the feeder link frequency band corresponding to a respective spot beam and/or satellite antenna feed element. Accordingly, two frequency translators may be provided at the satellite 101 for each spot beam and/or satellite antenna feed element, with a first frequency translator being used to translate a segment of the feeder up-link frequency band to a segment of the service down-link frequency band for the spot beam and/or satellite antenna feed element, and with a second frequency translator being used to translate a segment of the service up-link frequency band for the spot beam and/or satellite antenna feed element to a segment of the feeder down-link frequency band. A third frequency translator may be used to translate a segment of the service up-link frequency band for the spot beam and/or satellite antenna feed element to a segment of the feeder down-link frequency band if the satellite receive antenna subsystem is configured to receive more than one spatial polarization (i.e., Right-Hand Circular Polarization (RHCP) and Left-Hand Circular Polarization (LHCP)).

Systems and methods for reducing satellite feeder link bandwidth/carriers in cellular satellite systems are discussed in U.S. Patent Application No. 60/383,688 to Karabinis filed May 28, 2002, and assigned to the assignee of the present invention. The disclosure of U.S. Patent Application No. 60/383,688 is incorporated herein in its entirety by reference. As discussed in U.S. Patent Application No. 60/383,688, information content is nonidentically mapped between service link carriers and feeder link carriers at a cellular satellite. A reduced number of satellite feeder link carriers compared to the number of satellite service link carriers and/or a reduced total bandwidth of the satellite feeder link carriers compared to the satellite service link carriers thereby may be obtained.

Figure 3A:
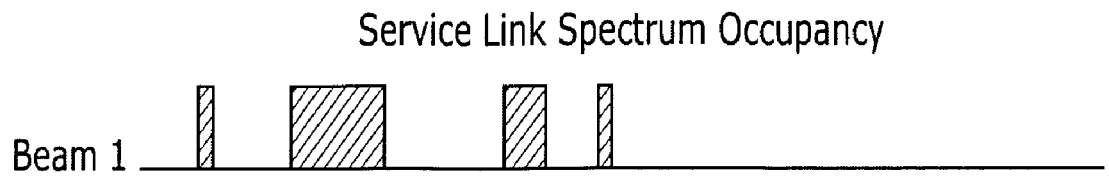
FIGS. 3a-c are spectrum occupancy diagrams illustrating transponder frequency translation using linear spectrum mapping.
Figure 3B:
Figure 3C:
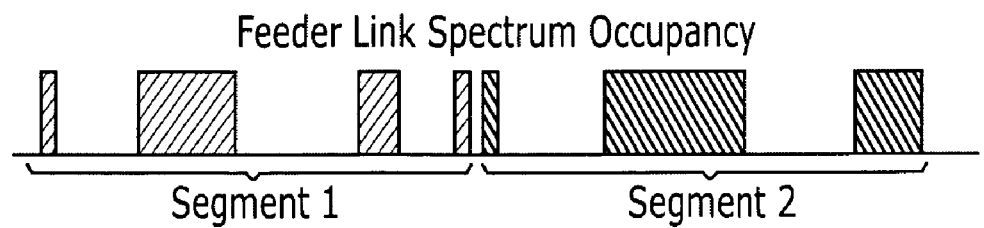

In the example of FIGS. 3a-c, a linear frequency translation between feeder and service links is used to support beams 1 and 2 illustrated in FIGS. 3a and 3b with the beams 1 and 2 of FIGS. 3a and 3b being the same as beams 1 and 2 of FIGS. 2a and 2b discussed above. More particularly, two frequency translators (one for Beam 1 and one for Beam 2) may be used to perform the illustrated translation for service down-links for coverage areas 107a and 107c (including down-links for Service Link 1 and Service Link 4, respectively). More particularly, a first segment (Segment 1) of the feeder link frequency band may be used to transmit information (from a satellite gateway, such as satellite gateway 103a and/or 103b, to the satellite 101) for service down-links of Beam 1 corresponding to coverage area 107a, and a second segment (Segment 2) of the feeder link frequency band may be used to transmit information (from a satellite gateway, such as satellite gateway 103a and/or 103b, to the satellite 101) for service down-links of Beam 2 corresponding to coverage area 107c. As discussed above, the feeder link frequency band used for communications between the satellite 101 and the satellite gateway(s) 103a and/or 103b does not overlap with the service link frequency band used for communications between the satellite 101 and the mobile radioterminals 105.

At the satellite 101, the first segment (Segment 1) of the feeder link frequency band transmitted by at least one satellite gateway (such as satellite gateway 103a and/or 103b) illustrated in FIG. 3c is translated (mapped) to a segment of the service link frequency band allocated for service down-links to coverage area 107a over Beam 1 as shown in FIG. 3a. The satellite 101 can then apply appropriate (generally complex) antenna element weights so that service down-links are transmitted over the desired spot beam (Beam 1) providing service for the coverage area 107a. Similarly, the second segment (Segment 2) of the feeder link frequency band that is transmitted by at least one satellite gateway (such as satellite gateway 103a and/or 103b) illustrated in FIG. 3c is translated (mapped) to a segment of the service link frequency band allocated for service down-links to coverage area 107c over Beam 2 as shown in FIG. 3b. The satellite 101 can then apply appropriate antenna element weights to the translated (mapped) feeder-link band frequency band segment so that service down-links are transmitted over the desired spot beam (Beam 2) providing service for the coverage area 107c. It will be understood that the appropriate antenna element weights may be applied to the feeder-link band frequency segment before it is translated (mapped) from the feeder link band to the service link band. It will also be understood that the appropriate antenna element weights may be applied at the satellite and/or at the satellite gateway(s).

Frequency allocation and translation (mapping) as discussed above with respect to FIGS. 3a-c, may thus allow a reduced complexity of satellite operation and/or payload. A greater bandwidth of feeder link frequency spectrum, however, may be consumed. According to embodiments of the present invention, a two dimensional feeder link frequency spectrum may be provided to increase feeder link capacity. For example, an effective feeder link bandwidth may be doubled by providing two orthogonally polarized feeder links between a satellite gateway, such as satellite gateway 103a, and the satellite 101 using the same feeder link frequency spectrum. In an alternative, the two orthogonally polarized feeder links may be provided between the satellite 101 and respective (adjacent or spaced apart) satellite gateways 103a-b.

In addition or in an alternative, cellular frequency reuse may be used for feeder links between the satellite and a plurality of spaced apart satellite gateways. For example, the satellite 101 may include directional feeder link antennas each directed to a respective satellite gateway, and the feeder link frequency band, in its entirety and/or partially, may be allocated to the different satellite gateways to reduce interference therebetween. In other words, different feeder link spot beams may be provided so that adjacent feeder link spot beams do not share same portions of the feeder link frequency band. Same portions of the feeder link frequency band may be shared by spaced apart feeder link spot beams.

When providing cellular frequency reuse for feeder links, sufficient isolation may need to be provided between feeder link cells (spot beams) to maintain a sufficient ratio of $C/(N_O + I_O)$ in the feeder link budget where C is the carrier power, $N_O$ is the noise spectral density, and $I_O$ is the interference spectral density. Providing sufficient isolation between feeder link spot beams (cells) may require a relatively large feeder link antenna aperture at the satellite 101. Apertures of feeder link antennas at the satellite 101 may be reduced by including a pilot signal and/or a data sequence (that may be a priori known to a gateway receiver) in feeder down-links from the satellite 101 to the satellite gateways 103a-b, and interference cancellation may be performed among the satellite gateways based on a priori knowledge of the pilot and/or data sequence waveform.

In addition, a terrestrial communications network including one or a plurality of terrestrial base stations may provide communications for radioterminals in one or more of the satellite coverage areas 107a-e using frequencies of the satellite service link frequency band. For example, a terrestrial communications network may provide communications service for mobile radioterminals in an urban area of a satellite coverage area to provide a higher density of communications than may be desirable for satellite communications. Communications services for the same mobile radioterminals may be provided by the satellite in regions (such as rural regions) of the satellite coverage area(s) not covered by a terrestrial communications network.

The sharing of frequencies of a satellite frequency band between a space-based communications network and a terrestrial communications network is discussed, for example, in the following U.S. patents and U.S. patent publications. Satellite radioterminal communications systems and methods that may employ terrestrial reuse of satellite frequencies are described, for example, in U.S. Pat. No. 6,684,057 to Karabinis, entitled Systems and Methods for Terrestrial Reuse of Cellular Satellite Frequency Spectrum; and Published U.S. Patent Application Nos. U.S. 2003/0054760 to Karabinis, entitled Systems and Methods for Terrestrial Reuse of Cellular Satellite Frequency Spectrum; U.S. 2003/0054761 to Karabinis, entitled Spatial Guardbands for Terrestrial Reuse of Satellite Frequencies; U.S. 2003/0054814 to Karabinis et al., entitled Systems and Methods for Monitoring Terrestrially Reused Satellite Frequencies to Reduce Potential Interference; U.S. 2003/0073436 to Karabinis et al., entitled Additional Systems and Methods for Monitoring Terrestrially Reused Satellite Frequencies to Reduce Potential Interference; U.S. 2003/0054762 to Karabinis, entitled Multi-Band/Multi-Mode Satellite Radiotelephone Communications Systems and Methods; U.S. 2003/0153267 to Karabinis, entitled Wireless Communications Systems and Methods Using Satellite-Linked Remote Terminal Interface Subsystems; U.S. 2003/0224785 to Karabinis, entitled Systems and Methods for Reducing Satellite Feeder Link Bandwidth/Carriers In Cellular Satellite Systems; U.S. 2002/0041575 to Karabinis et al., entitled Coordinated Satellite-Terrestrial Frequency Reuse; U.S. 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; U.S. 2003/0068978 to Karabinis et al., entitled Space-Based Network Architectures for Satellite Radiotelephone Systems; U.S. 2003/0143949 to Karabinis, entitled Filters for Combined Radiotelephone/GPS Terminals; U.S. 2003/0153308 to Karabinis, entitled Staggered Sectorization for Terrestrial Reuse of Satellite Frequencies; and U.S. 2003/0054815 to Karabinis, entitled Methods and Systems for Modifying Satellite Antenna Cell Patterns In Response to Terrestrial Reuse of Satellite Frequencies. The disclosures of all of above referenced patents and patent publications are hereby incorporated herein by reference in their entirety as if set forth fully herein.

Figure 4:
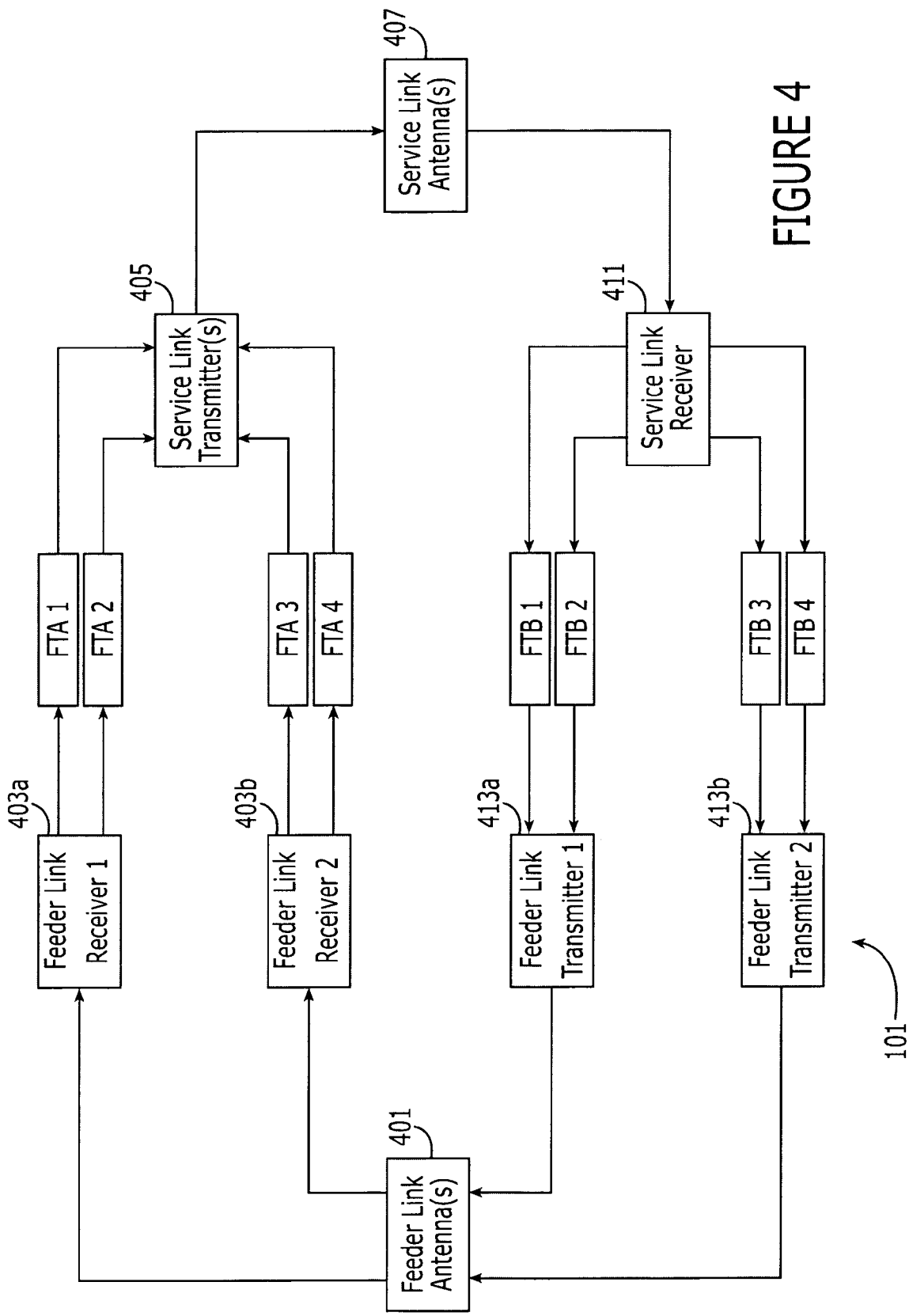
FIG. 4 is a block diagram illustrating satellites according to embodiments of the present invention.

FIG. 4 is a block diagram illustrating a satellite 101 according to embodiments of the present invention. As shown, the satellite 101 may provide links for transmission/reception between a satellite gateway and a radioterminal using one or more feeder link antenna(s) 401, one or more feeder link receivers 403a-b, one or more service link transmitter(s) 405, one or more service link antenna(s) 407, one or more service link receiver(s) 411, one or more feeder link transmitters 413a-b, and a plurality of linear frequency translators FTA1-4 and FTB1-4. More particularly, the feeder link antenna(s) 401 and the feeder link receivers 403a-b may provide reception of up link portions of feeder links (e.g., Feeder Link 1 and/or Feeder Link 2) from satellite gateways (e.g., 103a and/or 103b). The feeder link antenna(s) 401 and the feeder link transmitters 413a-b may provide transmission of down link portions of feeder links (e.g., Feeder Link 1 and/or Feeder Link 2) to satellite gateways (e.g., 103a and/or 103b). The service link antenna(s) 407 and the service link receiver 411 may provide reception of up link portions of service links (e.g., Service Links 1-5) from radioterminals (e.g., 105a-e) in respective coverage areas (e.g., 107a-e). The service link antenna(s) 407 and the service link transmitter 411 may provide transmission of down link portions of service links (e.g., Service Links 1-5) to radioterminals (e.g., 105a-e) in respective coverage areas (e.g., 107a-e).

A single service link antenna 407 may provide different service links (also referred to as spot beams) for different coverage areas. While the service link antenna(s) 407 is shown as a single block, separate receive and transmit service link antennas may be used, and/or different service link antennas may be used for different service links for different coverage areas. According to some embodiments of the present invention, the service link antenna(s) 407 may include at least one phased array antenna providing a plurality of spot beams with each spot beam supporting a service link for a different coverage area. Accordingly, beam forming techniques according to embodiments of the present invention may be used so that up link and/or down link portions of the service links (Service Links 1-5) may be received and/or transmitted using a single phased array service link antenna 407.

Similarly, a single feeder link antenna 401 may provide different feeder links for different satellite gateways. For example, a single feeder link antenna 401 may provide different feeder links to spatially separated gateways using spot beam forming, and/or different directional feeder link antennas may provide different feeder links to spatially separated gateways. In addition or in an alternative, one or more feeder link antennas 401 may provide different feeder links having different (e.g., orthogonal) polarizations. Accordingly, feeder link capacity may be increased by providing different feeder links to different gateways separated by space and/or polarization over the same feeder link frequency band.

According to some embodiments of the present invention, the feeder link receiver 403a and the feeder link antenna 401 may receive an up link portion of a first feeder link (Feeder Link 1) transmitted from the satellite gateway to the satellite 101 over a feeder link frequency band. The service link transmitter 405 and the service link antenna 407 may transmit a down link portion of a service link (Service Link 1) from the satellite 101 to at least one radioterminal 105a in a coverage area 107a over a service link frequency band. Moreover, the service link and the feeder link frequency bands may be different. In addition, the frequency translator FTA1 may provide linear frequency translation of a frequency segment of the up link portion of the feeder link (Feeder Link 1) from the feeder link frequency band to the service link frequency band to provide a frequency segment for the down link portion of the service link (Service Link 1) for coverage area 107a. As shown in FIGS. 3a-c, a frequency segment (Segment 1 of FIG. 3c) of the feeder link frequency band from an up link portion of the feeder link (Feeder Link 1) may be linearly frequency translated using frequency translator FTA1 to provide a frequency segment (Beam 1 of FIG. 3a) to be transmitted from service link antenna 407 as a service link (Service Link 1) for coverage area 107a. Because the frequency translator FTA1 provides linear frequency translation, a bandwidth of frequencies spanned by the frequency segment of the feeder link may be the same as a bandwidth of frequencies spanned by the frequency segment of the service link.

The service link transmitter 405 and the service link antenna 407 may provide a down link portion of a second service link (Service Link 2) from the satellite 101 to at least one radioterminal 105b in a coverage area 107b over the service link frequency band. The frequency translator FTA2 may provide linear frequency translation of a second frequency segment of the up link portion of the feeder link (Feeder Link 1) from the feeder link frequency band to the service link frequency band to provide a frequency segment for the down link portion of the service link (Service Link 2) for coverage area 107b. As shown in FIGS. 3a-c, a frequency segment (Segment 2 of FIG. 3c) of the feeder link frequency band from an up link portion of the feeder link (Feeder Link 1) may be linearly frequency translated using frequency translator FTA2 to provide a frequency segment (Beam 2 of FIG. 3b) to be transmitted from service link antenna 407 as a down link portion of a second service link (Service Link 2) for coverage area 107b.

The frequency translators FTA1 and FTA2 may thus translate different non-overlapping frequency segments of the up link portion of the same feeder link to the service link frequency band to provide down link portions of different service links for different coverage areas. More particularly, the first frequency segment (Beam 1 of FIG. 3a) may provide content for a first plurality of radioterminals (including radioterminal 105a) in the first coverage area 107a, and the second frequency segment (Beam 2 of FIG. 3b) may provide content for a second plurality of radioterminals (including radioterminal 107b) in the second coverage area 107b. The feeder link receiver 403a may thus be configured to receive an up link portion of a single feeder link (Feeder Link 1) from a single satellite gateway 103a, and different frequency segments of the up link portion of the single feeder link may be translated from the feeder link frequency band to the service link frequency band using respective linear frequency translators FTA1 and FTA2.

In addition, the feeder link receiver 403b and the feeder link antenna 401 may receive an up link portion of a second feeder link (Feeder Link 2) between from a second satellite gateway 103b over a feeder link frequency band. The service link transmitter 405 and the service link antenna 407 may transmit a down link portion of a third service link (Service Link 3) from the satellite 101 to at least one radioterminal 105d in a coverage area 107d over a service link frequency band. As discussed above, the service link and the feeder link frequency bands may be different. In addition, the frequency translator FTA3 may provide linear frequency translation of a frequency segment of the up link portion of the second feeder link (Feeder Link 2) from the feeder link frequency band to the service link frequency band to provide a frequency segment of the down link portion of the third service link (Service Link 3) for coverage area 107d. A frequency segment of the feeder link frequency band from an up link portion of the feeder link (Feeder Link 2) may be linearly frequency translated using frequency translator FTA3 to provide a frequency segment (for a spot beam) to be transmitted from service link antenna 407 as a down link portion of a service link (Service Link 3) for coverage area 107d. Because the frequency translator FTA3 provides linear frequency translation, a bandwidth of frequencies spanned by the frequency segment of the up link portion of the feeder link may be the same as a bandwidth of frequencies spanned by the frequency segment of the down link portion of the service link.

The service link transmitter 405 and the service link antenna 407 may transmit a down link portion of a fourth service link (Service Link 4) from the satellite 101 to at least one radioterminal 105c in a coverage area 107c over the service link frequency band. The frequency translator FTA4 may provide linear frequency translation of a fourth frequency segment of the up link portion of the second feeder link (Feeder Link 2) from the feeder link frequency band to the service link frequency band to provide a frequency segment of the down link portion of the fourth service link (Service Link 4) for coverage area 107c. A frequency segment of the feeder link frequency band from an up link portion of the second feeder link (Feeder Link 2) may be linearly frequency translated using frequency translator FTA4 to provide a frequency segment (for a spot beam) to be transmitted from service link antenna 407 as a down link portion of a fourth service link (Service Link 4) for coverage area 107c.

The frequency translators FTA3 and FTA4 may thus translate different non-overlapping frequency segments of the up link portion of the same feeder link to the service link frequency band to provide down link portions of different service links for different coverage areas. More particularly, the third frequency segment may provide content for a third plurality of radioterminals (including radioterminal 105d) in the third coverage area 107d, and the fourth frequency segment may provide content for a fourth plurality of radioterminals (including radioterminal 105c) in the second coverage area 107c. The feeder link receiver 403b may thus be configured to receive an up link portion of a single feeder link (Feeder Link 2) from a single satellite gateway 103b, and different frequency segments of the up link portion of the single feeder link may be translated from the feeder link frequency band to the service link frequency band using respective linear frequency translators FTA3 and FTA4.

The up link portions of the first and second feeder links (Feeder Link 1 and Feeder Link 2) may operate over the same feeder link frequency band to increase feeder link capacity. Accordingly, separation between the feeder links may be provided using spatial separation of the satellite gateways and/or using different polarizations. For example, the satellite gateways 103a-b may be sufficiently separated in geography that up link portions of the different feeder links may be received at the satellite 101 using different directional receive antennas and/or using a receive antenna array capable of receiving different feeder link spot beams. In addition or in an alternative, the satellite gateways 103a-b may transmit using different (e.g. orthogonal) polarizations, and the feeder link antenna 401 and/or the feeder link receivers 403a-b may be able to separate up link portions of the different feeder links having the different polarizations.

Moreover, a priori known pilot signals may be used by the satellite 101 to reduce interference between up link portions of the two feeder link signals. For example, first pilot signals may be transmitted from the first satellite gateway 103a to the satellite 101 over the up link portion of the first feeder link (Feeder Link 1), and second pilot signals may be transmitted from the second satellite gateway 103b to the satellite 101 over the up link portion of the second feeder link (Feeder Link 2) with the first and second pilot signals being different. The feeder link receivers 403a and/or 403b may then perform interference cancellation based on a priori knowledge of the first and second pilot signals.

According to additional embodiments of the present invention, the feeder link transmitter 413a and the feeder link antenna 401 may transmit a down link portion of a first feeder link (Feeder Link 1) from the satellite 101 to the satellite gateway 103a over a feeder link frequency band. The service link receiver 411 and the service link antenna 407 may receive an up link portion of a service link (Service Link 1) from at least one radioterminal 105a in a coverage area 107a over a service link frequency band. Moreover, the service link and the feeder link frequency bands may be different. In addition, the frequency translator FTB1 may provide linear frequency translation of a frequency segment of the up link portion of the service link (Service Link 1) from the service link frequency band to the feeder link frequency band to provide a frequency segment for the down link portion of the feeder link (Feeder Link 1) from coverage area 107a. A frequency segment of the service link frequency band from an up-link portion of the service link (Service Link 1) from coverage area 107a may be linearly frequency translated using frequency translator FTB1 to provide a frequency segment to be transmitted from the feeder link antenna 401 as a frequency segment of the down link portion of the feeder link (Feeder Link 1) to the satellite gateway 103a. Because the frequency translator 413a provides linear frequency translation, a bandwidth of frequencies spanned by the frequency segment of the down link portion of the feeder link may be the same as a bandwidth of frequencies spanned by the frequency segment of the up link portion of the service link.

The service link receiver 411 and the service link antenna 407 may receive an up link portion of a second service link (Service Link 2) from at least one radioterminal 105b in a coverage area 107b over the service link frequency band. The frequency translator FTB2 may provide linear frequency translation of a second frequency segment of the up link portion of the second service link (Service Link 2) from the service link frequency band to the feeder link frequency band to provide a second frequency segment for the down link portion of the feeder link (Feeder Link 1) from the coverage area 107b. The up link portion of the second service link (Service Link 2) for the coverage area 107b may thus be linearly frequency translated using frequency translator FTB2 to provide a second frequency segment for the down link portion of the feeder link (Feeder Link 1).

The frequency translators FTB1 and FTB2 may thus translate up-link portions of different service links (e.g., Service Link 1 and Service Link 2) to different non-overlapping frequency segments of the down link portion of the same feeder link (e.g., Feeder Link 1) to provide up link portions of service links for different coverage areas. More particularly, a first frequency segment (e.g., an up-link portion) of the first service link (Service Link 1) may provide content from a first plurality of radioterminals (including radioterminal 105a) in the first coverage area 107a, and the second frequency segment (e.g., an up-link portion) of the second service link (Service Link 2) may provide content from a second plurality of radioterminals (including radioterminal 105a) in the first coverage area 107a. The feeder link transmitter 413a may thus be configured to transmit a down link portion of a single feeder link (Feeder Link 1) to a single satellite gateway 103a, and different frequency segments of the down link portion of the single feeder link may be translated to the feeder link frequency band from the service link frequency band using respective frequency translators FTB1 and FTB2.

In addition, the feeder link transmitter 413b and the feeder link antenna 401 may provide transmissions over a down link portion of a second feeder link (Feeder Link 2) from the satellite 101 to the satellite gateway 103b over the feeder link frequency band. The service link receiver 411 and the service link antenna 407 may receive an up link portion of a third service link (Service Link 3) from at least one radioterminal 105d in coverage area 107d over the service link frequency band. As discussed above, the service link frequency band and the feeder link frequency band may be different. In addition, the frequency translator FTB3 may provide linear frequency translation of a frequency segment of the up link portion of the third service link (Service Link 3) for coverage area 107d from the service link frequency band to the feeder link frequency band to provide a third frequency segment for the down link portion of the second feeder link (Feeder Link 2). Because the frequency translator FTB3 provides linear frequency translation, a bandwidth of frequencies spanned by the frequency segment for the down link portion of the feeder link may be may be the same as a bandwidth of frequencies spanned by the frequency segment for the up link portion of the service link.

The service link receiver 411 and the service link antenna 407 may also receive an up link portion of a fourth service link (Service Link 4) from at least one radioterminal 105c in a coverage area 107c over the service link frequency band. The frequency translator FTB4 may provide linear frequency translation of a fourth frequency segment of the up link portion of the fourth service link (Service Link 4) for coverage area 107c from the service link frequency band to the feeder link frequency band to provide a fourth frequency segment for the down link portion of the second feeder link (Feeder Link 2). A frequency segment of the service link frequency band from an up link portion of the fourth service link (Service Link 4) may be linearly frequency translated using frequency translator FTB4 to provide a frequency segment to be transmitted from the feeder link antenna 401 as a fourth frequency segment for the down link portion of the second feeder link (Feeder Link 2).

The frequency translators FTB3 and FTB4 may thus translate up link portions of different service links (e.g., Service Link 3 and Service Link 4) for different coverage areas (e.g., 107d and 107c) from the service link frequency band to different non-overlapping frequency segments of the feeder link frequency band for a down link portion of the same feeder link (e.g., Feeder Link 2). More particularly, the third frequency segment from the up link portion of the third service link (Service Link 3) may provide content from a third plurality of radioterminals (including radioterminal 105d) in the third coverage area 107d, and the fourth frequency segment from the up link portion of the fourth service link (Service Link 4) may provide content from a fourth plurality of radioterminals (including radioterminal 105c) in the fourth coverage area 107c. The feeder link transmitter 413b may thus be configured to transmit a down link portion of a single feeder link (Feeder Link 2) to a single satellite gateway 103b, and different frequency segments of the down link portion of the single feeder link may be translated from the service link frequency band to the feeder link frequency band using respective linear frequency translators FTA3 and FTA4.

The down link portions of the first and second feeder links (Feeder Link 1 and Feeder Link 2) transmitted using the feeder link transmitters 413a and 413b may operate over the same feeder link frequency band to increase feeder link capacity. Accordingly, separation between the feeder links may be provided using directional spot beams, using spatial separation of the satellite gateways, and/or using different polarizations. For example, the satellite gateways 103a-b may be sufficiently separated in geography that the different down link portions of the feeder links may be transmitted from the satellite 101 using different directional transmit antennas and/or using a transmit antenna array capable of transmitting different feeder link spot beams. In addition or in an alternative, the satellite gateways 103a-b may selectively receive different (e.g., orthogonal) polarizations, and the feeder link antenna 401 and/or the feeder link transmitters 413a-b may be configured to transmit the down link portions of the different feeder links using different polarizations.

Moreover, a priori signals may be used by the satellite gateways 103a and/or 103b to reduce interference between down link portions of the two feeder link signals. For example, first pilot signals may be transmitted from the first feeder link transmitter 413a and/or the feeder link antenna 401 to the satellite gateway 103a over the down link portion of the first feeder link (Feeder Link 1), and second pilot signals may be transmitted from the second feeder link transmitter 413b and/or the feeder link antenna 401 to the satellite gateway 103b over the down link portion of the second feeder link (Feeder Link 2), with the first and second pilot signals being different. The satellite gateways 103a and/or 103b may then perform interference cancellation based on a priori knowledge of the first and second pilot signals.

In the drawings and specification, there have been disclosed embodiments of the invention and, although specific terms are employed, they are used in a generic and descriptive sense only and not for purposes of limitation. The following claims are provided to ensure that the present application meets all statutory requirements as a priority application in all jurisdictions and shall not be construed as setting forth the scope of the present invention. Moreover, while particular systems are discussed above with respect to the figures, analogous methods are also included in the present invention.

That which is claimed is:

1. A method of operating a communications system including a satellite and a satellite gateway, the method comprising:
   providing a feeder link between the satellite and the satellite gateway, wherein the feeder link is provided over a feeder link frequency band for communication of information between the satellite gateway and the satellite, wherein the feeder link comprises a frequency segment including at least first and second bands of frequencies that provide information between the satellite gateway and the satellite and wherein the first and second bands of frequencies are non-contiguous and separated by a third band of frequencies that does not provide any information between the satellite gateway and the satellite;
   providing a service link between the satellite and at least one radioterminal in a coverage area of the satellite, wherein the service link is provided over a service link frequency band and wherein the feeder link and service link frequency bands are different and non-overlapping; and
   linearly frequency translating the frequency segment of the feeder link including the first, second, and third bands from the feeder link frequency band to the service link frequency band to provide a frequency segment of the service link including fourth and fifth bands of frequencies including the information provided by the respective first and second bands of frequencies, wherein the fourth and fifth bands of frequencies are non-contiguous and separated by a sixth band of frequencies corresponding to the third band of frequencies that does not provide any information.

2. A method according to claim 1 wherein the service link comprises a first service link, wherein the frequency segment of the service link comprises a first frequency segment of the first service link, wherein the frequency segment of the feeder link comprises a first frequency segment of the feeder link, wherein the feeder link comprises a second frequency segment including at least a seventh band of frequencies that provide information between the satellite gateway and the satellite, wherein the first and second frequency segments of the feeder link are non-overlapping, and wherein a bandwidth of the seventh band of frequencies is no greater than a bandwidth of the third band of frequencies, the method further comprising:
   providing a second service link between the satellite and at least one radioterminal in a second coverage area of the satellite different than the first coverage area, wherein the second service link is provided over the service link frequency band; and
   linearly frequency translating the second frequency segment of the feeder link including the seventh band of frequencies from the feeder link frequency band to the service link frequency band to provide a second frequency segment of the second service link including an eighth band of frequencies including the information provided by the seventh band of frequencies, and wherein the eighth band of frequencies overlaps a portion of the sixth band of frequencies.

3. A method according to claim 2 wherein the first frequency segment of the feeder link comprises a first continuous frequency segment of the feeder link, wherein the first frequency segment of the first service link comprises a first continuous frequency segment of the first service link that provides content for a first plurality of radioterminals in the first coverage area using different frequencies separated over the first continuous frequency segment of the first service link, wherein the second frequency segment of the feeder link comprises a second continuous frequency segment of the feeder link, and wherein the second frequency segment of the second service link comprises a second continuous frequency segment of the second service link that provides content for a second plurality of radiotermninals in the second coverage area using different frequencies separated over the second continuous frequency segment of the second service link.

4. A method according to claim 2 wherein the first frequency segment of the feeder link is transmitted to the satellite using a first polarization and wherein the second frequency segment of the feeder link is transmitted to the satellite using a second polarization, wherein the first and second polarizations are different.

5. A method according to claim 4 wherein the second polarization is orthogonal with respect to the first polarization.

6. A method according to claim 1 wherein a bandwidth of frequencies spanned by the frequency segment of the feeder link is about the same as a bandwidth of frequencies spanned by the frequency segment of the service link.

7. A method according to claim 1 wherein the service link comprises a first service link, wherein the frequency segment of the service link comprises a first frequency segment of the first service link, wherein the feeder link comprises a first feeder link, and wherein the frequency segment of the first feeder link comprises a first frequency segment of the first feeder link, the method further comprising:
  providing a second feeder link between the satellite and a second satellite gateway, wherein the second feeder link is provided over the feeder link frequency band for communication of information between the second satellite gateway and the satellite, wherein the second frequency segment of the second feeder link includes at least a seventh band of frequencies that provide information between the second satellite gateway and the satellite, and wherein a bandwidth of the seventh band of frequencies is no greater than a bandwidth of the third band of frequencies;
  providing a second service link between the satellite and at least one radioterminal in a second coverage area of the satellite different than the first coverage area, wherein the second service link is provided over the service link frequency band; and
  linearly frequency translating the second frequency segment of the second feeder link including the seventh band of frequencies from the feeder link frequency band to the service link frequency band to provide a second frequency segment of the second service link including an eighth band of frequencies including the information provided by the seventh band of frequencies, and wherein the eighth band of frequencies overlaps a portion of the sixth band of frequencies.

8. A method according to claim 7 wherein the first frequency segment of the first feeder link comprises a first continuous frequency segment of the first feeder link, wherein the first frequency segment of the first service link comprises a first continuous frequency segment that provides content for a first plurality of radioterminals in the first coverage area using different frequencies separated over the first continuous frequency segment of the first service link, wherein the second frequency segment of the second feeder link comprises a second continuous frequency segment of the second feeder link, and wherein the second frequency segment of the second service link comprises a second continuous frequency segment that provides content for a second plurality of radioterminals in the second coverage area using different frequencies separated over the second continuous frequency segment of the second service link.

9. A method according to claim 7 further comprising:
  transmitting first pilot signals from the first satellite gateway to the satellite over the first feeder link;
  transmitting second pilot signals from the second satellite gateway to the satellite over the second feeder link wherein the first and second pilot signals are different; and
  performing interference cancellation at the satellite based on a priori knowledge of the first and second pilot signals.

10. A method according to claim 1 wherein the frequency segment of the service link provides content for the at least one radioterminal.

11. A method according to claim 1 wherein the frequency segment of the service link provides content for a plurality of radioterminals in the coverage area.

12. A method of operating a communications system including a satellite and a satellite gateway, the method comprising:
  providing a feeder link between the satellite and the satellite gateway, wherein the feeder link is provided over a feeder link frequency band for communication of information between the satellite gateway and the satellite;
  providing a service link between the satellite and at least one radioterminal in a coverage area of the satellite, wherein the service link is provided over a service link frequency band and wherein the feeder link and service link frequency bands are different and non-overlapping, wherein the service link comprises a frequency segment including at least first and second bands of frequencies that provide information between the satellite and the at least one radioterminal and wherein the first and second bands of frequencies are non-contiguous and separated by a third band of frequencies that does not provide any information between the satellite and the at least one radioterminal; and
  linearly frequency translating the frequency segment of the service link including the first, second, and third bands from the service link frequency band to the feeder link frequency band to provide a frequency segment of the feeder link including fourth and fifth bands of frequencies including the information provided by the respective first and second bands of frequencies, wherein the fourth and fifth bands of frequencies are non-contiguous and separated by a sixth band of frequencies corresponding to the third band of frequencies that does not provide any information.

13. A method according to claim 12 wherein the service link comprises a first service link, wherein the frequency segment of the service link comprises a first frequency segment of the first service link, and wherein the frequency segment of the feeder link comprises a first frequency segment of the feeder link, the method further comprising:

providing a second service link between the satellite and at least one radioterminal in a second coverage area of the satellite different than the first coverage area, wherein the second service link is provided over the service link frequency band wherein the second service link comprises a second frequency segment of the second service link including at least a seventh band of frequencies that provide information between the at least one mobile terminal in the second coverage area and the satellite, and wherein a bandwidth of the seventh band of frequencies is no greater than a bandwidth of the third band of frequencies, and wherein the seventh band of frequencies overlaps a portion of the third band of frequencies; and linearly frequency translating the second frequency segment of the second service link including the seventh band of frequencies from the service link frequency band to the feeder link frequency band to provide a second frequency segment of the feeder link including an eighth band of frequencies including the information provided by the seventh band of frequencies, and wherein the first and second frequency segments of the feeder link are non-overlapping.

14. A method according to claim 13 wherein the first frequency segment of the feeder link comprises a first continuous frequency segment of the feeder link, wherein the first frequency segment of the first service link comprises a first continuous frequency segment of the first service link that provides content from a first plurality of radioterminals in the first coverage area using different frequencies separated over the first continuous frequency segment of the first service link, wherein the second frequency segment of the feeder link comprises a second continuous frequency segment of the feeder link, and wherein the second frequency segment of the second service link comprises a second continuous frequency segment of the second service link that provides content from a second plurality of radioterminals in the second coverage area using different frequencies separated over the second continuous frequency segment of the second service link.

15. A method according to claim 13 wherein the first frequency segment of the feeder link is transmitted from the satellite using a first polarization and wherein the second frequency segment of the feeder link is transmitted from the satellite using a second polarization, wherein the first and second polarizations are different.

16. A method according to claim 15 wherein the second polarization is orthogonal with respect to the first polarization.

17. A method according to claim 12 wherein a bandwidth of frequencies spanned by the frequency segment of the feeder link is about the same as a bandwidth of frequencies spanned by the frequency segment of the service link.

18. A method according to claim 12 wherein the service link comprises a first service link, wherein the feeder link comprises a first feeder link, wherein the frequency segment of the service link comprises a first frequency segment of the first service link, and wherein the frequency segment of feeder link comprises a first frequency segment of the first feeder link, the method further comprising:

providing a second feeder link between the satellite and a second satellite gateway, wherein the second feeder link is provided over the feeder link frequency band for communication of information between the second satellite gateway and the satellite;

providing a second service link between the satellite and at least one radioterminal in a second coverage area of the satellite different than the first coverage area, wherein the second service link is provided over the service link frequency band, wherein the second service link comprises a second frequency segment of the second service link including at least a seventh band of frequencies that provide information between the at least one mobile terminal in the second coverage area and the satellite, wherein a bandwidth of the seventh band of frequencies is no greater than a bandwidth of the third band of frequencies, and wherein the seventh band of frequencies overlaps a portion of the third band of frequencies; and linearly frequency translating the second frequency segment of the second service link including the seventh band of frequencies from the service link frequency band to the feeder link frequency band to provide a second frequency segment of the second feeder link including an eighth band of frequencies including the information provided by the seventh band of frequencies.

19. A method according to claim 18 wherein the first frequency segment of the first feeder link comprises a first continuous frequency segment of the first feeder link, wherein the first frequency segment from the first service link comprises a first continuous frequency segment of the first service link that provides content from a first plurality of radioterminals in the first coverage area using different frequencies separated over the first continuous frequency segment of the first service link, wherein the second frequency segment of the second feeder link comprises a second continuous frequency segment of the second feeder link, and wherein the second frequency segment from the second service link comprises a second continuous frequency segment of the second service link that provides content from a second plurality of radioterminals in the second coverage area using different frequencies separated over the second continuous frequency segment of the second service link.

20. A method according to claim 18 further comprising:
transmitting first pilot signals from the satellite over the first feeder link to the first satellite gateway;
transmitting second pilot signals from the satellite over the second feeder link to the second satellite gateway wherein the first and second pilot signals are different; and
performing interference cancellation at the first and second satellite gateways based on a priori knowledge of the first and second pilot signals.

21. A method according to claim 12 wherein the frequency segment of the service link provides content from the at least one radioterminal in the coverage area of the service link.

22. A method according to claim 12 wherein the frequency segment of the service link provides content from a plurality of radioterminals in the coverage area of the service link.

23. A satellite for relaying communications between a satellite gateway and at least one radioterminal in a coverage area of the satellite, the satellite comprising:
a feeder link receiver configured to receive information from the satellite gateway using a feeder link provided over a feeder link frequency band, wherein the feeder link comprises a frequency segment including at least first and second bands of frequencies that provide information between the satellite gateway and the satellite and wherein the first and second bands of frequencies are non-contiguous and separated by a third band of frequencies that does not provide any information between the satellite gateway and the satellite;

a service link transmitter configured to transmit information to the at least one radioterminal in the coverage area using a service link provided over a service link frequency band, wherein the service link frequency band and the feeder link frequency band are different and non-overlapping; and a frequency translator coupled between the feeder link receiver and the service link transmitter, wherein the frequency translator is configured to provide linear frequency translation of the frequency segment of the feeder link including the first, second, and third bands from the feeder link frequency band to the service link frequency band to provide a frequency segment of the service link including fourth and fifth bands of frequencies including the information provided by the respective first and second bands of frequencies, wherein the fourth and fifth bands of frequencies are non-contiguous and separated by a sixth band of frequencies corresponding to the third band of frequencies that does not provide any information.

24. A satellite according to claim 23 wherein the service link comprises a first service link, wherein the frequency segment of the service link comprises a first frequency segment of the first service link, wherein the frequency segment of the feeder link comprises a first frequency segment of the feeder link, wherein the feeder link comprises a second frequency segment including at least a seventh band of frequencies that provide information between the satellite gateway and the satellite, wherein the first and second frequency segments of the feeder link are non-overlapping, wherein the bandwidth of the seventh band of frequencies is no greater that a bandwidth of the third band of frequencies, and wherein the service link transmitter is further configured to transmit information to at least one radioterminal in a second coverage area different than the first coverage area using a second service link provided over the service link frequency band, the satellite further comprising:

a second frequency translator coupled between the feeder link receiver and the service link transmitter, wherein the second frequency translator is configured to provide linear frequency translation of the second frequency segment of the feeder link from the feeder link frequency band to the service link frequency band to provide a second frequency segment of the second service link including an eighth band of frequencies including the information provided by the seventh band of frequencies, and wherein the eighth band of frequencies overlaps a portion of the sixth band of frequencies.

25. A satellite according to claim 24 wherein the first frequency segment of the feeder link comprises a first continuous frequency segment of the feeder link, wherein the first frequency segment of the first service link comprises a first continuous frequency segment of the first service link that provides content for a first plurality of radiotermninals in the first coverage area using different frequencies separated over the first continuous frequency segment of the first service link, wherein the second frequency segment of the feeder link comprises a second continuous frequency segment of the feeder link, and wherein the second frequency segment of the second service link comprises a second continuous frequency segment of the second service link that provides content for a second plurality of radioterminals in the second coverage area using different frequencies separated over the second continuous frequency segment of the second service link.

26. A satellite according to claim 24 wherein the feeder link receiver is configured to receive first frequency segment using a first polarization and to receive the second frequency segment using a second polarization, wherein the first and second polarizations are different.

27. A satellite according to claim 26 wherein the second polarization is orthogonal with respect to the first polarization.

28. A satellite according to claim 23 wherein a bandwidth of frequencies spanned by the frequency segment of the feeder link is about the same as a bandwidth of frequencies spanned by the frequency segment of the service link.

29. A satellite according to claim 23 wherein the feeder link receiver comprises a first feeder link receiver, wherein the frequency translator comprises a first frequency translator, wherein the feeder link comprises a first feeder link, wherein the service link comprises a first service link, wherein the frequency segment of the service link comprises a first frequency segment of the first service link, and wherein the frequency segment of the feeder link comprises a first frequency segment of the first feeder link, the satellite further comprising:

a second feeder link receiver configured to receive information from a second satellite gateway using a second feeder link provided over the feeder link frequency band, wherein the second frequency segment of the second feeder link includes at least a seventh band of frequencies that provide information between the second satellite gateway and the satellite, and wherein a bandwidth of the seventh band of frequencies is no greater than a bandwidth of the third band of frequencies, wherein the service link transmitter is configured to provide a second service link between the satellite and at least one radioterminal in a second coverage area of the satellite different than the first coverage area, wherein the second service link is provided over the service link frequency band; and a second frequency translator coupled between the second feeder link receiver and the service link transmitter, wherein the second frequency translator is configured to provide linear frequency translation of the second frequency segment of the second feeder link including the seventh band of frequencies from the feeder link frequency band to the service link frequency band to provide a second frequency segment of the second service link including an eighth band of frequencies including the information provided by the seventh band of frequencies, and wherein the eighth band of frequencies overlaps a portion of the sixth band of frequencies.

30. A satellite according to claim 29 wherein the first frequency segment of the first feeder link comprises a first continuous frequency segment of the first feeder link, wherein the first frequency segment of the first service link comprises a first continuous frequency segment of the first service link that provides content for a first plurality of radioterminals in the first coverage area using different frequencies separated over the first continuous frequency segment of the first service link, wherein the second frequency segment of the second feeder link comprises a second continuous frequency segment of the second feeder link, and wherein the second frequency segment of the second service link comprises a second continuous frequency segment of the second service link that provides content for a second plurality of radioterminals in the second coverage area using different frequencies separated over the second continuous frequency segment of the second service link.

31. A satellite according to claim 29 wherein the first feeder link receiver is configured to receive first pilot signals from the first satellite gateway over the first feeder link, wherein the second feeder link receiver is configured to receive second pilot signals from the second satellite gateway over the second feeder link, wherein the first and second pilot signals are different, and wherein the first and/or second feeder link receivers are configured to perform interference cancellation based on a priori knowledge of the first and second pilot signals.

32. A satellite according to claim 23 wherein the frequency segment of the service link provides content for the at least one radioterminal in the coverage area.

33. A satellite according to claim 23 wherein the frequency segment of the service link provides content for a plurality of radioterminals in the coverage area.

34. A satellite for relaying communications between a satellite gateway and at least one radioterminal in a coverage area of the satellite, the satellite comprising:
a service link receiver configured to receive information from the at least one radioterminal in the coverage area using a service link provided over a service link frequency band, wherein the service link comprises a frequency segment including at least first and second bands of frequencies that provide information between the satellite and the at least one radioterminal and wherein the first and second bands of frequencies are non-contiguous and separated by a third band of frequencies that does not provide any information between the satellite and the at least one radioterminal;
a feeder link transmitter configured to transmit information to the satellite gateway using a feeder link provided over a feeder link frequency band, wherein the service link frequency band and the feeder link frequency band are different and non-overlapping; and
a frequency translator coupled between the service link receiver and the feeder link transmitter, wherein the frequency translator is configured to provide linear frequency translation of the frequency segment of the service link including the first, second, and third bands from the service link frequency band to the feeder link frequency band to provide a frequency segment of the feeder link including fourth and fifth bands of frequencies including the information provided by the respective first and second bands of frequencies, wherein the fourth and fifth bands of frequencies are non-contiguous and separated by a sixth band of frequencies corresponding to the third band of frequencies that does not provide any information.

35. A satellite according to claim 34 wherein the frequency translator comprises a first frequency translator, wherein the service link comprises a first service link, wherein the frequency segment of the service link comprises a first frequency segment of the first service link, and wherein the frequency segment of the feeder link comprises a first frequency segment of the feeder link, wherein the service link receiver is further configured to receive information from at least one radioterminal in a second coverage area different than the first coverage area using a second service link provided over the service link frequency band, wherein the second service link comprises a second frequency segment of the second service link including at least a seventh band of frequencies that provide information between the at least one mobile terminal in the second coverage area and the satellite, wherein a bandwidth of the seventh band of frequencies is no greater than a bandwidth of the third band of frequencies, and wherein the seventh band of frequencies overlaps a portion of the third band of frequencies, the satellite further comprising:
a second frequency translator coupled between the service link receiver and the feeder link transmitter, wherein the second frequency translator is configured to provide linear frequency translation of the second frequency segment of the second service link including the seventh band of frequencies from the service link frequency band to the feeder link frequency band to provide a second frequency segment of the feeder link including an eighth band of frequencies including the information provided by the seventh band of frequencies, and wherein the first and second frequency segments of the feeder link are non-overlapping.

36. A satellite according to claim 35 wherein the first frequency segment of the feeder link comprises a first continuous frequency segment of the feeder link, wherein the first frequency segment of the first service link comprises a first continuous frequency segment of the first service link that provides content from a first plurality of radioterminals in the first coverage area using different frequencies separated over the first continuous frequency segment of the first service link, wherein the second frequency segment of the feeder link comprises a second continuous frequency segment of the feeder link, and wherein the second frequency segment of the second service link comprises a second continuous frequency segment of the second service link that provides content from a second plurality of radioterminals in the second coverage area using different frequencies separated over the second continuous frequency segment of the second service link.

37. A satellite according to claim 35 wherein the feeder link transmitter is configured to transmit the first frequency segment using a first polarization and to transmit the second frequency segment using a second polarization, wherein the first and second polarizations are different.

38. A satellite according to claim 37 wherein the second polarization is orthogonal with respect to the first polarization.

39. A satellite according to claim 34 wherein a bandwidth of frequencies spanned by the frequency segment of the feeder link is about the same as a bandwidth of frequencies spanned by the frequency segment of the service link.

40. A satellite according to claim 34 wherein the feeder link transmitter comprises a first feeder link transmitter, wherein the feeder link comprises a first feeder link, wherein the service link comprises a first service link, wherein the frequency segment of the service link comprises a first frequency segment of the first service link, and wherein the frequency segment of the feeder link comprises a first frequency segment of the first feeder link, the satellite further comprising:
a second feeder link transmitter configured to transmit information to a second satellite gateway using a second feeder link provided over the feeder link frequency band, wherein the service link receiver is configured to provide a second service link between the satellite and at least one radioterminal in a second coverage area of the satellite different than the first coverage area, wherein the second service link comprises a second frequency segment of the second service link including at least a seventh band of frequencies that provide information between the at least one mobile terminal in the second coverage area and the satellite, wherein a bandwidth of the seventh band of frequencies is no greater than a bandwidth of the third band of frequencies, and wherein the seventh band of frequencies overlaps a portion of the third band of frequencies; and a second frequency translator coupled between the second feeder link receiver and the service link transmitter, wherein the second frequency translator is configured to provide linear frequency translation of the second frequency segment of the second service link including the seventh band of frequencies from the service link frequency band to the feeder link frequency band to provide a second frequency segment of the second feeder link including an eighth band of frequencies including the information provided by the seventh band of frequencies.

41. A satellite according to claim 40 wherein the first frequency segment of the first feeder link comprises a first continuous frequency segment of the first feeder link, wherein the first frequency segment of the first service link comprises a first continuous frequency segment of the first service link that provides content from a first plurality of radioterminals in the first coverage area using different frequencies separated over the first continuous frequency segment of the first service link, wherein the second frequency segment of the feeder link comprises a second continuous frequency segment of the feeder link, and wherein the second frequency segment of the second service link comprises a second continuous frequency segment of the second service link that provides content from a second plurality of radioterminals in the second coverage area using different frequencies separated over the second continuous frequency segment of the second service link.

42. A satellite according to claim 40 wherein the first feeder link transmitter is configured to transmit first pilot signals to the first satellite gateway over the first feeder link, wherein the second feeder link transmitter is configured to transmit second pilot signals to the second satellite gateway over the second feeder link, wherein the first and second pilot signals are different, and wherein the first and/or second satellite gateways are configured to perform interference cancellation based on a priori knowledge of the first and second pilot signals.

43. A satellite according to claim 34 wherein the frequency segment of the service link provides content from the at least one radioterminal in the coverage area.

44. A satellite according to claim 34 wherein the frequency segment of the service link provides content from a plurality of radioterminals in the coverage area.

45. A method according to claim 1 wherein the frequency segment of the service link provides content for a plurality of radioterminals in the coverage area using different frequencies separated over the frequency segment of the service link, and wherein linearly frequency translating comprises linearly frequency translating the frequency segment of the feeder link including the first, second, and third bands from the feeder link frequency band to the service link frequency band to provide the frequency segment of the service link including the different frequencies separated over the frequency segment of the service link that provides content for the plurality of radiotelephones.

46. A method according to claim 12 wherein the frequency segment of the service link provides content for a plurality of radioterminals in the coverage area using different frequencies separated over the frequency segment of the service link, and wherein linearly frequency translating comprises linearly frequency translating the frequency segment of the service link that provides content from the plurality of radiotelephones from the service link frequency band including the different frequencies separated over the frequency segment of the service link to the feeder link frequency band to provide the frequency segment of the feeder link including the first, second, and third bands.

47. A satellite according to claim 23 wherein the frequency segment of the service link provides content for a plurality of radioterminals in the coverage area using different frequencies separated over the frequency segment of the service link, and wherein the frequency translator is configured to linearly frequency translate the frequency segment of the feeder link including the first, second, and third bands from the feeder link frequency band to the service link frequency band to provide the frequency segment of the service link including the different frequencies separated over the frequency segment of the service link that provides content for the plurality of radiotelephones.

48. A satellite according to claim 34 wherein the frequency segment of the service link provides content for a plurality of radioterminals in the coverage area using different frequencies separated over the frequency segment of the service link, and wherein the frequency translator is configured to linearly frequency translate the frequency segment of the service link including the different frequencies separated over the frequency segment of the service link that provides content from the plurality of radiotelephones from the service link frequency band to the feeder link frequency band including the first, second, and third bands to provide the frequency segment of the feeder link.

* * * * *

UNITED STATES PATENT AND TRADEMARK OFFICE
CERTIFICATE OF CORRECTION

| | | |
|---|---|---|
| PATENT NO. | : 7,706,748 B2 | Page 1 of 1 |
| APPLICATION NO. | : 11/167010 | |
| DATED | : April 27, 2010 | |
| INVENTOR(S) | : Dutta | |

It is certified that error appears in the above-identified patent and that said Letters Patent is hereby corrected as shown below:

In the Claims:
Column 25, Claim 35, Line 56:  Please correct "service link, and wherein"
to read -- service link, wherein --

Signed and Sealed this

Twenty-eighth Day of September, 2010

David J. Kappos
*Director of the United States Patent and Trademark Office*